(12) United States Patent
Rehberg

(10) Patent No.: US 8,517,020 B2
(45) Date of Patent: Aug. 27, 2013

(54) PRESSURIZED CONTAINER VALVE, IN PARTICULAR COMPRESSED AIR BOTTLE VALVE FOR A COMPRESSED AIR RESPIRATOR

(75) Inventor: Rainer Rehberg, Berlin (DE)

(73) Assignee: MSA Auer GmbH, Berlin (DE)

( * ) Notice: Subject to any disclaimer, the term of this patent is extended or adjusted under 35 U.S.C. 154(b) by 1093 days.

(21) Appl. No.: 12/224,933

(22) PCT Filed: Mar. 15, 2007

(86) PCT No.: PCT/DE2007/000491
§ 371 (c)(1),
(2), (4) Date: May 27, 2009

(87) PCT Pub. No.: WO2007/110041
PCT Pub. Date: Oct. 4, 2007

(65) Prior Publication Data
US 2009/0301494 A1    Dec. 10, 2009

(30) Foreign Application Priority Data
Mar. 17, 2006  (DE) .......................... 10 2006 012 778

(51) Int. Cl.
*A62B 9/02*    (2006.01)
*A62B 7/00*    (2006.01)

(52) U.S. Cl.
USPC ................................. 128/205.24; 128/204.18

(58) Field of Classification Search
USPC .......... 137/588, 625.21, 505.25, 613, 625.15; 251/304, 248; 141/3, 4, 18, 21
See application file for complete search history.

(56) References Cited

U.S. PATENT DOCUMENTS

| | | | | | |
|---|---|---|---|---|---|
| 1,364,059 | A | * | 12/1920 | Jones | 251/304 |
| 1,375,205 | A | * | 4/1921 | Budzinsky | 137/625.15 |
| 2,906,464 | A | * | 9/1959 | Tomlinson | 239/461 |

(Continued)

FOREIGN PATENT DOCUMENTS

| DE | 3539317 A1 | 5/1987 |
|---|---|---|
| DE | 199 17 431 A1 | 11/2000 |

(Continued)

OTHER PUBLICATIONS

English Translation of the International Preliminary Report on Patentability (Chapter I)—for PCT/DE2007/00491.

*Primary Examiner* — Justine Yu
*Assistant Examiner* — Rachel Young
(74) *Attorney, Agent, or Firm* — The Webb Law Firm

(57) ABSTRACT

The invention relates to a pressurized container valve which has a simple structure, is easy to use and is functionally reliable and which is used, in particular, in a compressed air respirator which is used as rescue breathing apparatus. Said valve comprises a supply connection (2) and a discharge housing (3) which are connected together on the front sides such that they can be rotated or can be displaced in a linear manner against each other, by means of first and second planar ceramic valve discs acting as blocking elements (8, 11). A supply and/or discharge opening (9, 12) respectively provided in the first and/or second valve disc is aligned with the supply channel (10) and/or the discharge channel (15) in the supply connection (2) and/or in the discharge housing. The valve can be opened or sealingly closed in a simple manner by rotating the discharge housing about the longitudinal axis thereof or displacing the discharge housing in a linear manner in relation to the supply connection. Said pressurized container which is connected to the valve can be filled according to the same principle via the filling opening (13).

9 Claims, 1 Drawing Sheet

(56) References Cited

U.S. PATENT DOCUMENTS

| | | | | |
|---|---|---|---|---|
| 3,426,797 | A | * | 2/1969 | Baker .................. 137/625.31 |
| 5,088,689 | A | * | 2/1992 | Hendricks et al. ........... 251/304 |
| 5,386,966 | A | * | 2/1995 | Gosch ..................... 251/304 |
| 5,411,059 | A | | 5/1995 | Sever et al. |
| 5,931,181 | A | * | 8/1999 | Cook et al. ................. 137/100 |
| 6,167,908 | B1 | | 1/2001 | Rottger |
| 7,341,075 | B2 | * | 3/2008 | Taylor .................... 137/614.2 |
| 7,748,380 | B1 | * | 7/2010 | Phifer et al. ............ 128/201.25 |

FOREIGN PATENT DOCUMENTS

| | | |
|---|---|---|
| DE | 19917431 A1 | 11/2000 |
| DE | 102 25 003 A1 | 12/2003 |
| EP | 1 327 804 A1 | 7/2003 |
| EP | 1585003 A1 | 10/2005 |
| GB | 1 256 342 | 12/1971 |
| GB | 2 233 738 A | 1/1991 |

* cited by examiner

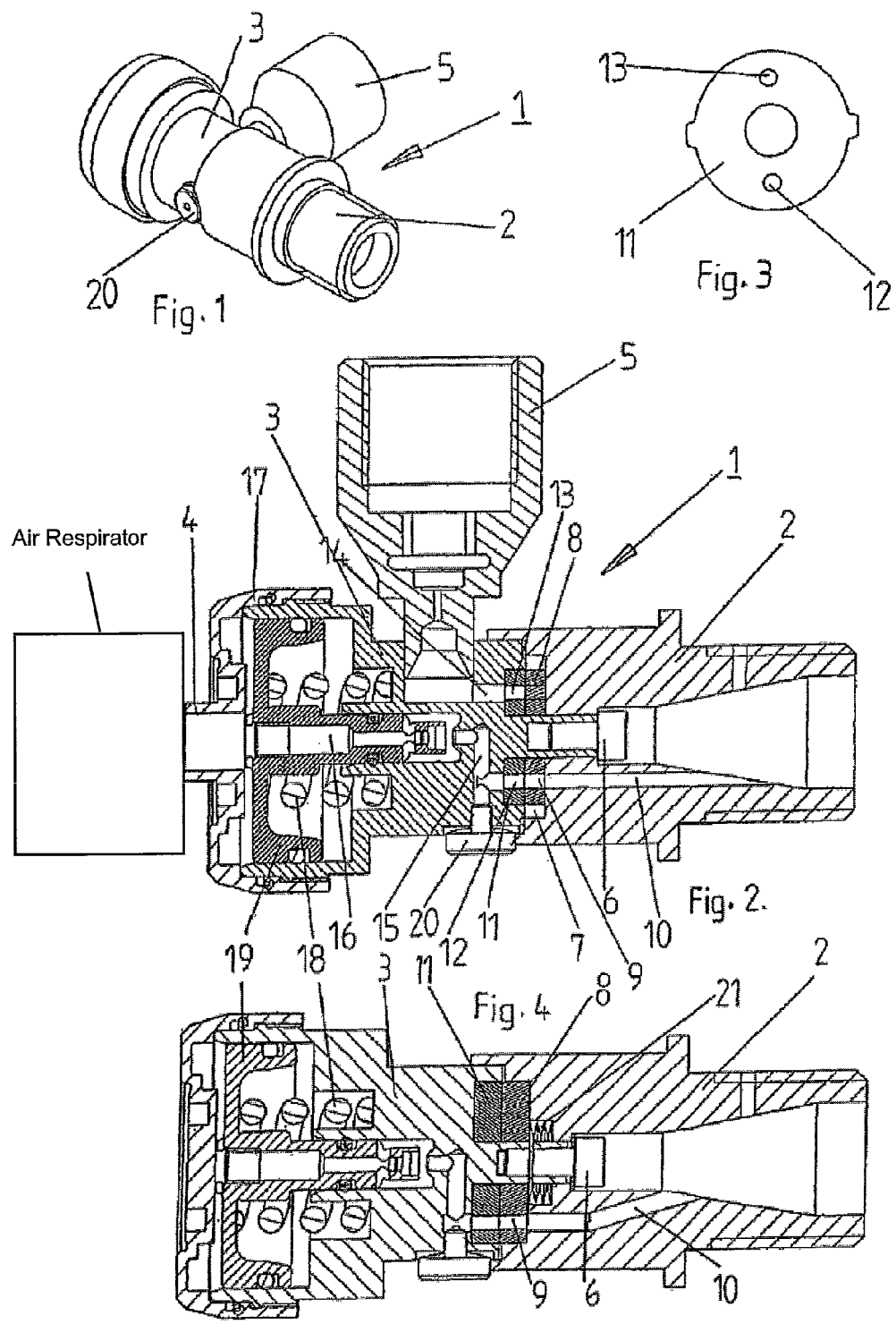

PRESSURIZED CONTAINER VALVE, IN PARTICULAR COMPRESSED AIR BOTTLE VALVE FOR A COMPRESSED AIR RESPIRATOR

The invention relates to a pressurized container valve, in particular compressed air bottle valve comprising integrated pressure reducer for a compressed air respirator, in particular a rescue breathing apparatus, which encompasses a supply connection and a discharge housing comprising supply and/or discharge channels, which can be closed by means of a blocking element.

The breathable air required by a user is stored under high pressure in compressed air bottles for breathing apparatuses so as to provide said compressed air to the user when required via a bottle valve, which is connected to the compressed air bottle and which comprises an integrated pressure reducer with reduced, breathable pressure.

Valve fittings for pressurized containers are sufficiently known from the state of the art. DE 199 17 431 C2, for example, describes a valve fitting connected to a pressurized container, which comprises a valve housing comprising a container connection and a discharge connection, which are connected to one another by means of a media channel. A blocking valve, which is operated via a hand wheel, is assigned to the valve housing. By turning the hand wheel, a closing element comprising an integrated sealing insert can be displaced against a main valve seat and can be lifted therefrom, respectively, so as to release or close the media channel between the container connection and the discharge connection. A pressure controller, which is connected to the media channel upstream of the discharge connection, is furthermore integrated into the valve housing so as to reduce the pressure of the air supplied by the pressure container to the level required by the consumer. Finally, a fill nozzle comprising a non return valve, which is connected to the media channel, is assigned to the valve housing so as to be capable of filling the pressurized container, for example a compressed air bottle, with compressed air against the effect of the non return valve.

In connection with compressed air bottles for compressed air respirators, such valve fittings are disadvantageous in that at least two turns of the hand wheel are necessary for opening the blocking valve so as to ensure the function of the bottle vale required for the pressure-reduced supply of breathable air for the user and so as to avoid accidents caused by an aperture angle of the blocking valve, which is too small, respectively.

A further disadvantage of the known bottle valves is that the blocking device does not close and is not closed to a sufficient extent, respectively, so that an air quantity, albeit small, is capable of constantly escaping in an insensible manner from reserved, filled compressed air bottles. When in use, the bottle is then not or not completely filled, which is dangerous to the user. Such leakage losses can be particularly problematic in so-called compressed air rescue breathing apparatuses comprising a cover, which are used for the escape and rescue from contaminant-laden areas and which are oftentimes not used for a very long period. During this period, the compressed air stored in very small compressed air bottles can escape gradually so that the safety of the persons to be saved in case of an emergency is not ensured.

The known bottle valves of the above-mentioned type can furthermore be produced only at considerable costs due to the constructive design of the blocking valve and of the non return valve, which is required for the filling.

The invention is based on the object of developing a pressurized container comprising an integrated pressure reducer and a blocking device for a compressed air respirator, which can be produced in a cost-efficient manner, which ensures a simple, reliable handling as well as an improved seal effect.

According to the invention, the object is solved by means of a pressurized container valve embodied according to the features of patent claim 1. Advantageous developments and practical embodiments of the invention are the object of the subclaims.

The basic idea of the invention lies in an embodiment of the pressurized container valve, which is divided at right angles to the throughflow direction comprising two, preferably ceramic valve discs, which sit solidly on one another in the parting plane. Said valve discs are fastened to the respective part, namely a supply connection fastened to the pressurized container and to a discharge housing, which can be rotated about an axis of rotation or which can be displaced in a linear manner in cross direction. A supply opening, which is connected to the supply connection and a discharge opening, which is connected to the discharge housing, respectively, are embodied in the valve discs. By means of rotating the movable discharge housing with respect to the stationary supply connection, the air supply can be released in response to openings located above one another. Otherwise, the closed surface of the valve disc, which is held at the discharge housing, is located on the supply hole so as to form a seal and the air supply is interrupted. The surfaces of the ceramic valve discs, which are located adjacent to one another, are embodied so as to be smooth and flat in such a manner that even though adhesive powers caused thereby allow for the linear or rotatory displacement of the valve discs against one another, but ensure a safe seal at the same time.

The pressurized container valve, which is embodied in such a manner, in particular, for compressed air bottles of compressed air respirators and which is preferably used for rescue breathing apparatuses, can be opened by means of less than one rotation so that a connected breathing apparatus is immediately ready for operation. Furthermore, the blocking element formed from ceramic valve discs ensures a tight closure of compressed air bottles so that the leakage losses are small and so that rescue breathing apparatuses are still serviceable even after a long period of non-use. Due to the small number of components, the valve can be produced with low operating costs. It is functionally reliable, robust and easy to handle.

According to a further feature of the invention, provision can be made in the second valve plate, which is attached to the discharge housing, for a filling opening, which is arranged in peripheral direction at a distance to the discharge opening. Said filling opening is aligned with a filling channel in the discharge housing, which is connected to a fill nozzle. The pressurized container can be filled anew in that the filling opening is aligned to the supply opening in the first valve plate by rotating the discharge housing. The non return valve, which is usually necessary, is no longer required.

In an embodiment of the invention, the two valve discs are braced to one another by means of an elastic component, such as a spring or a ring consisting of an elastic material, for example.

Preferably, the cross sectional form of the openings in the ceramic valve discs is embodied in such a manner that the compressed air only flows off gradually in response to the opening of the valve, that is, the starting section, which is flown through, is initially small. For example, the supply and/or the discharge opening can have a drop-shaped or triangular cross section.

In a further embodiment of the invention, provision is made on the rotatable discharge housing for a stop element, which interacts with end stops embodied on the supply connection for the purpose of fixing the discharge and filling position, respectively.

An exemplary embodiment of the invention is defined in detail by means of the drawing.

FIG. 1 shows a perspective view of a compressed air bottle valve comprising a fill nozzle, which is screwed on;

FIG. 2 shows a lateral sectional view of the compressed air bottle valve according to FIG. 1 in an open position, which releases the air supply to the user;

FIG. 3 shows a top view of the valve disc held in the rotatable housing part; and FIG. 4 shows a sectional view of the compressed air bottled valve without a fill nozzle.

As is shown in FIG. 1, the pressurized container valve 1 comprises, for example, a supply connection 2, which can be fixedly connected to a compressed air bottle (not illustrated) of a rescue breathing apparatus, a discharge housing 3 connected to the cover of the rescue breathing apparatus comprising a discharge connection 4 and a fill nozzle 5, which can be connected to a compressor for filling the compressed air bottle with compressed air. The supply connection 2 and the discharge housing 3 are connected on the front sides located opposite one another so as to be capable of being rotated by means of a fastening means 6, which is embodied as a screw or pin and which is oriented in axial direction. A first valve disc 8 is held in a positive fit in peripheral direction in a recess 7 of the supply connection 2 at the front side. A supply opening 9 provided in the first valve disc 8 is aligned with a supply channel 10 in the supply connection 2. A second valve disc 11 is fixed in a positive fit in a recess of the discharge housing 3 at the front side, which—spaced apart from one another in peripheral direction—encompasses a discharge opening 12 and a filling opening 13. The filling opening 13 is connected to the fill nozzle 5, which is screwed together in the discharge housing 3, via a filling channel 14.

The two valve discs 8 and 11 are made of a ceramic material, which is embodied so as to be flat and smooth on the contact surfaces, which abut on one another in a holohedral manner so that the two valve discs 8 and 11, which can be rotated against one another, abut on one another so as to form a seal. To support the tight contact of the two valve discs 8 and 11, the first (lower) valve disc 8 can be pushed against the upper valve disc 11 under the effect of a spring 21. By rotating the discharge housing 3 against the stationary supply connection 2, either the discharge opening 12—as illustrated in FIG. 2—or the filling opening 13 can be brought into a position, which corresponds to the supply opening 9 and thus to the supply channel 10 so that either air generated by a compressor can be guided into the pressurized container or air removed from the pressurized container can reach into the discharge connection 4 and from there to the cover (to the user) via channels 15 and 16, which are embodied in the discharge housing 3 as well as in a pressure reducer integrated therein. The discharge connection 4 is located in a cover 17, which is fixedly screwed onto the discharge housing 3.

The pressure reducer integrated in the discharge housing 3 is embodied in a known manner and substantially comprises a piston 19, which is under the effect of a spring 18 and of the pressure-reduced medium and which briefly interrupts the media supply from the pressurized container prior to the air discharge from the pressure reducer. A stop element 20, which interacts with stops (not illustrated), which are embodied on the supply connection 2, is attached to the exterior of the discharge housing 3. The stops fix the discharge housing 3 and thus either the discharge opening 12 or the filling opening 13 in a position, which is aligned with the supply opening 9, while in the position between the two stops, the supply opening 9 is tightly closed by the part of the second valve disc 11 located between the filling opening and the discharge opening.

FIG. 2 illustrates the pressurized container valve 1 in the position of the second valve disc 11, which releases the air supply to the user.

The use of the two ceramic valve discs 8 and 11, which abut on one another under the effect of adhesive powers, but which can be rotated against one another, ensure a safe closure of the pressurized container and a considerable reduction of the leakage losses. Rescue breathing apparatuses can thus be used reliably even after a long period of non-use.

The constructive design of the valve is simple and the costs are correspondingly low, because only few components, which are integrated directly into the valve housing, that is, the two valve discs 8 and 11, are required for the blocking and filling process. The installation of a non return valve into the air supply line is not necessary.

The handling of the valve is also conceivably simple and safe. A safe air supply to the user is already ensured after a quarter rotation of the discharge housing. The rotary motion of the discharge housing 3 can also be performed by means of the stop element. When using the valve in connection with a rescue breathing apparatus, the stop element 20 can be connected to a string or the like, so as to automatically release the air supply in connection with the handling of the rescue breathing apparatus. A slight opening of the blocking valve during the non-use and leakages connected therewith, for example by inadvertently striking against the valve body, are not possible, because the air supply is released only after a rotation of the discharge housing about approximately 90°.

The invention is not limited to the instant exemplary embodiment. With a connection of the two separate valve parts, the construction of which is different, for example, it is possible for the two valve discs not to be displaced against one another by means of a rotary motion, but by means of a different motion, e.g. a linear motion.

LIST OF REFERENCE NUMERALS 1 pressurized container valve
2 supply connection
3 discharge housing
4 discharge connection
5 fill nozzle
6 fastening means v. 2, 3
7 recess v. 2
8 first valve disc
9 supply opening
10 supply channel
11 second valve disc
12 discharge opening v. 11
13 filling opening v. 11
14 filling channel
15 channels in 3
16 channels in 19
17 cover
18 spring
19 piston
20 stop element
21 spring

The invention claimed is:

1. A pressurized container valve comprising a built-in pressure reducer for a compressed air respirator, a supply connection (2) and a discharge housing (3) comprising supply and discharge channels (10, 15), closable by means of a blocking element (8, 11), wherein the supply connection (2) and the discharge housing (3) are separate valve parts, which are braced to one another and which are displaceable to one another by means of rotary motion about an axis of rotation (6), wherein a first valve disc (8) comprising a supply opening (9) following the supply channel (10) and a second valve disc (11) comprising a discharge opening (12) following the discharge channel (15, 16) are fastened to the respective valve part, so as to be in direct 2-dimensional contact with one another,
wherein the second valve disc (11) encompasses a filling opening (13), which is spaced apart from the discharge opening (9) in peripheral direction and which is connected via a filling channel (14) to a fill nozzle (5), which is fastened to the discharge housing (3) so as to be capable of being detached for the purpose of newly filling a pressurized container.

2. The pressurized container valve according to claim 1, wherein the two valve discs (8, 11) can be pressed against one another under the effect of an elastic component.

3. The pressurized container valve according to claim 2, wherein the elastic component is a helical compression spring or a ring made of elastic material.

4. The pressurized container valve according to claim 1, wherein a stop element (20), which interacts with end stops embodied on the supply connection (2) for the purpose of fixing the discharge housing (3) in the discharge position or in the filling position, is attached to the discharge housing (3).

5. The pressurized container valve according to claim 4, wherein the stop element (20) is connected to an actuation means for automatically opening the pressurized container valve.

6. The pressurized container valve according to claim 1, wherein the discharge housing (3) is connected to an air respirator via a discharge connection (4) and wherein the pressure reducer (18, 19) is integrated into the discharge housing (3) for the purpose of providing breathable air.

7. The pressurized container valve according to claim 1, wherein the first and second valve disc (8, 11) are made of a ceramic material and wherein the surfaces touching one another are formed so as to be smooth and flat for the purpose of forming adhesive powers.

8. The pressurized container valve according to claim 1, wherein the cross sectional surface of the supply or discharge openings (9, 12) is embodied in such a manner that the volume thereof rises gradually in response to the opening of the valve.

9. The pressurized container valve according to claim 8, wherein the supply or the discharge opening (9, 12) encompasses a drop-shaped or triangular cross sectional surface.

* * * * *

UNITED STATES PATENT AND TRADEMARK OFFICE
CERTIFICATE OF CORRECTION

PATENT NO. : 8,517,020 B2  
APPLICATION NO. : 12/224933  
DATED : August 27, 2013  
INVENTOR(S) : Rainer Rehberg Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1348 days.

Signed and Sealed this

Fifteenth Day of September, 2015

Michelle K. Lee
*Director of the United States Patent and Trademark Office*